(12) United States Patent
Pinson et al.

(10) Patent No.: US 8,886,767 B1
(45) Date of Patent: Nov. 11, 2014

(54) SHARING RESOURCES IN A LOCAL SERVING OFFICE

(75) Inventors: George Scott Pinson, Portland, OR (US); Kevin C. Flanagan, Denver, CO (US); Xavier P. Denis, Beaverton, OR (US)

(73) Assignee: ARRIS Enterprises, Inc., Suwanee, GA (US)

( * ) Notice: Subject to any disclaimer, the term of this patent is extended or adjusted under 35 U.S.C. 154(b) by 86 days.

(21) Appl. No.: 13/422,537

(22) Filed: Mar. 16, 2012

(51) Int. Cl.
*G06F 15/16* (2006.01)

(52) U.S. Cl.
USPC ............... 709/219; 709/203; 709/229; 726/1

(58) Field of Classification Search
CPC ... G06F 15/173; H04L 65/4084; H04L 69/16; H04L 63/06
USPC ............................ 709/203, 219, 229; 726/1
See application file for complete search history.

(56) References Cited

U.S. PATENT DOCUMENTS

| | | | |
|---|---|---|---|
| 2003/0145094 A1* | 7/2003 | Staamann et al. ............ 709/229 |
| 2004/0044731 A1* | 3/2004 | Chen et al. .................... 709/203 |
| 2005/0183061 A1* | 8/2005 | Papanikolaou et al. ....... 717/103 |
| 2005/0278760 A1* | 12/2005 | Dewar et al. ..................... 725/94 |
| 2006/0064313 A1* | 3/2006 | Steinbarth et al. ................ 705/1 |
| 2007/0271519 A1* | 11/2007 | Hu et al. ........................ 715/745 |
| 2008/0288458 A1* | 11/2008 | Sun et al. .......................... 707/3 |
| 2010/0066642 A1* | 3/2010 | Fuller et al. .................... 345/1.1 |
| 2011/0119732 A1* | 5/2011 | Dunn ................................. 726/1 |
| 2012/0060006 A1* | 3/2012 | Paterson-Jones et al. .... 711/162 |

* cited by examiner

*Primary Examiner* — Tesfay Yohannes
(74) *Attorney, Agent, or Firm* — Troy A. Van Aacken

(57) ABSTRACT

Managing the storage and deletion of content on a content store shared by more than one local distribution office.

11 Claims, 6 Drawing Sheets

SHARING RESOURCES IN A LOCAL SERVING OFFICE

TECHNICAL FIELD

This disclosure relates to systems and methods that can manage the storage and deletion of content on a content store shared by more than one local distribution office.

BACKGROUND

An increasing magnitude of electronic files today are being network-stored, as opposed to stored locally (for example, locally stored on a hard drive connected to a user's computer, or a device connected to a user's home network. For example, users and customers can use an on-line service to store and share their photographs, videos, audio files, slide presentations, documents, or other electronic files. Sites can use a variety of different servers, repositories, NAS (network attached storage), SANs (Storage Attached Networks) or other devices to make available these electronic files. In one example, multiple service providers (MSOs), such as satellite, cable, telephone, and wireless companies, are providing services that deliver voice, data, and video over their networks. In many of these examples, electronic files are often stored at central repositories. A network of servers can be placed at multiple points in the network, wherein one or more servers have access to copies of electronic files, which can be stored on one or more storage devices, including tapes, optical media, hard disks, solid state drives, or any other type of storage device. To reduce load on the network backbone and help optimize streaming performance, these electronic file delivery networks can often be deployed in a hierarchical fashion. User devices can access a copy of the electronic files from a local file server, which might be located at a local distribution office (LDO). The LDO can be located at the edge of the network, near to the user device. If a local distribution office does not have access to a requested electronic file, then a request can be made to obtain all (or even parts) of the file from one or more repositories storing the files further upstream, or from another location.

Having a substantial number of client devices access the same upstream server when a highly demanded electronic file is requested can cause bottlenecks between the upstream server and the LDO server. A scheme in which every electronic file is stored at not only the upstream server locations but also every LDO can become unsustainable, resulting in the mass duplication of files that may not necessarily be needed or demanded in all regions. The number of electronic files will increase, and the number of users, each of which can have different demands for content, will also increase.

In the example of electronic files that are video content files, when video service providers place copies of content accessible by viewers, they would like to reduce the number of copies that need to be stored at local distribution offices, but at the same time, attempt to make sure that unanticipated demand for content not stored at the local distribution office does not result in a bottleneck at an upstream central server. While there are a number of programs that service providers anticipate will be watched by a large number of viewers, there is also content that are "non-hit items" providing more overall choices for viewers. These non-hit items (often referred to as "Long-tail content") in aggregate might still be viewed by a large audience, and can still result in the generation of a substantial amount of revenue.

Servers accessing the most popular content can be positioned close to the network edge at a local distribution office (LDO). Such an office can be, for example, a headend, which is closer to a subscriber's residence. Less popular content can be stored on one or more central servers deeper in the network from the subscriber (i.e., upstream). However, the demand for any particular program may not be very predictable, leading to indecisiveness as to whether to place such content at a local distribution office, or further upstream.

The prepositioning, storage, and retention of content at a local distribution office, and the transfer of content from sources deeper in the network, can tax the resources of a network, which impacts the efficiency of the network. Systems and methods strive to increase the predictability as to what content will be demanded, so as to efficiently move that content closer to the edge. Systems and methods also strive to maintain local content stores that are not replete with content that is no longer in demand. Additionally, when there are multiple small LDOs in a region, storing content at each headend, moving content to and from LDOs, even if the content is desirable, can consume network resources.

Typically, electronic files, such as content, are resources that are subject to each LDO's assertion of exclusivity, where each LDO is not aware of the content stored, requested, and managed by other LDOs. However, as addressed in this application, such resources can be shared between one or more LDOs.

BRIEF DESCRIPTION OF THE DRAWINGS

Like reference numbers and designations in the various drawings indicate like elements.

DETAILED DESCRIPTION

Example implementations, including systems and methods, can operate to manage the content accessed across local distribution offices, such as video headends.

Figure 1:
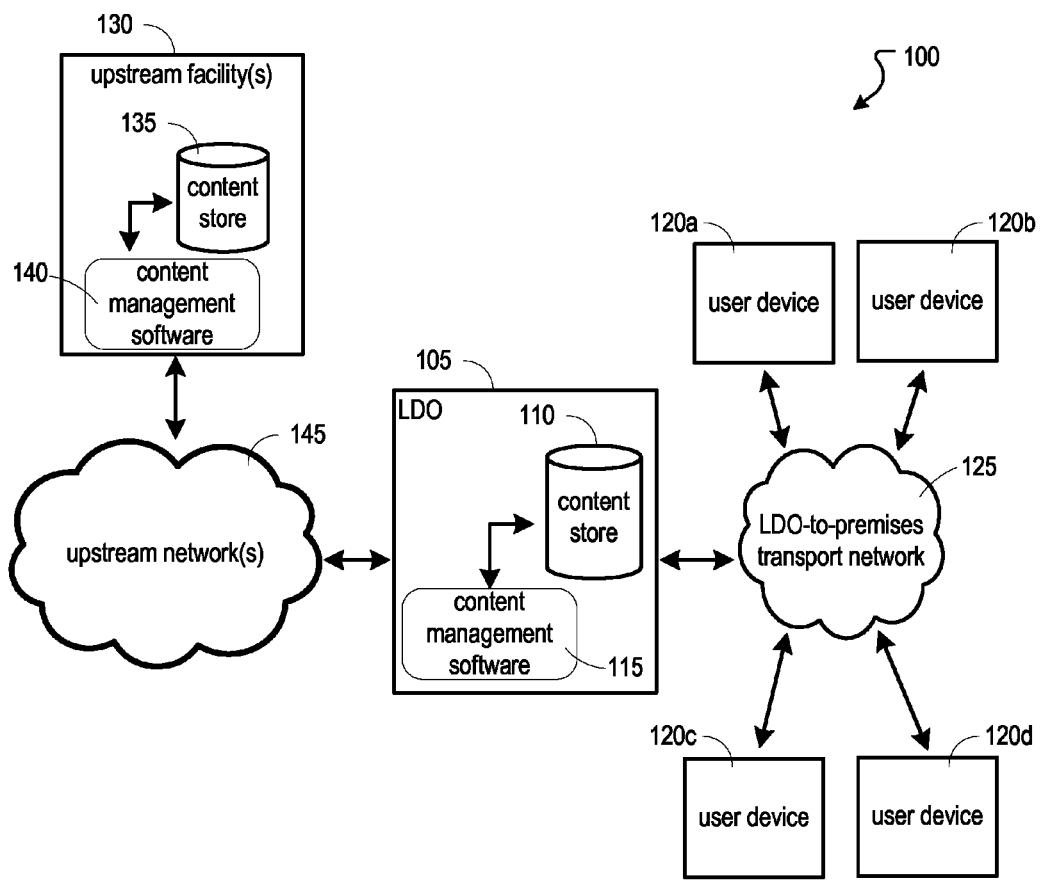
FIG. 1 is a block diagram illustrating an example network environment in which user devices can request electronic files, such as content from an LDO, and content can also be accessible via further upstream networks and facilities.

FIG. 1 is a block diagram illustrating an example of a network that can be used to transport or deliver electronic files, such as content. Content can be, for example, web objects, downloadable objects such as media files, software applications, documents, metadata, real time media streams, and other components of internet delivery (DNS, routes, and database queries). The delivery can be made via broadcast, switched digital video, and video on demand.

The network environment 100 can include a local distribution office (LDO) 105 at a local distribution point. One or more variations of such offices, operated by multiple service operators (MSOs) such as a cable, satellite, wireless, or telephone companies, have been referred to as a headend, end office, exchange end, local exchange, video serving office (VSO), central office (CO), or class-5 local exchange. The LDO 105 can contain various communications equipment for acquiring, processing, and transmitting content, such as one or more encoders, transcoders, modulation/demodulation devices, content servers, and other communications equipment that can provide video, data, and/or voice service to a user. Delivery methods include using IP unicast and multicast transmissions.

The LDO 105 can house one or more content repositories, such as storage devices 110, for storing content. The LDO 105 can also have hardware that executes software having one or more components or modules that perform tasks such as managing customer accounts, billing, provisioning and content/metadata management. For example, a content server having content management software 115 can operate to store content received by the LDO 105 in the content store 110, or respond to requests for content by retrieving the requested content from the content store 110.

Communications equipment at the LDO 105 can be operable to communicate with one or more user devices 120, which can be mobile wireless, or can be located at or near a user's premises. In FIG. 1, only four user devices 120a-d are shown for illustrative purposes, but more or less can be deployed or serviced. User devices 120a-d can be operable to request content from the LDO. User devices 110a-d can be, for example, cable modems, EMTAs (also known as cable telephony modems), televisions, residential gateways, set-top boxes, other customer premises equipment, and even mobile devices. A user device 120 can be operable to process communications sent to and received from an LDO 105. In some implementations, for example, a user device 120 can include modulator(s)/demodulator(s) and routers and/or switches that can process multimedia streams and send join requests. The user device 110 can be, for example, a set-top box that is operable to respond to a channel change request, send join requests, receive multimedia streams and content, record content, and/or send the content to a display device for display. A user device 120 can be a gateway device (often referred to as a residential gateway or home gateway, although gateway devices can reside at a non-residential place of business, commerce, or public gathering). An example gateway device can perform switching and routing and modulation/demodulation functions. A gateway device can also be connected to one or more other user devices, such as a set-top box that can receive content from the gateway for recording or for display, or a television set that can do the same. A user device can be responsive to commands initiated by a user through a user input device, such as a remote control, for example.

Still referring to FIG. 1, the communications equipment at the LDO 105 can communicate with one or more user devices 120a-d through an LDO-to-Premises transport network 125. Examples of a transport network 115 can include one or more hybrid-fiber coaxial (HFC) networks and/or RF over Glass (RFoG) networks. An example HFC network can use a combination of optical fibers and coaxial cable to send data to and receive data from the communications equipment at the edge serving office 105. One or more RFoG networks can be deployed with existing HFC networks. RFoG networks typically include an all-fiber service from the LDO 105 to a field node, or optical network unit (ONU), which is typically located at or near the user's premises. Coaxial cable can be used to connect the ONUs of an RFoG network to one or more user devices 120a-d. Additionally, any other wired or wireless networks can be used, including passive optical networks (PON), gigabit passive optical networks (GPON), digital subscriber line (DSL), Wi-MAX, or copper twisted-pair.

An LDO 105 can also be operative to communicate with one or more upstream facilities 130. Upstream facilities 125 can include a variety of intermediary and end offices, including but not limited to offices referred to as a regional office, national office, video headend office (VHO), or super headend office (SHO), each of which can include equipment for performing one or more of the functions of originating content, storing content, retrieving content, acquiring content, processing content, and transmitting content. For example, like an LDO 105, an upstream facility 130 can include one or more content stores 135. An upstream facility 130 can also have a content server having content management software 140, which can be one or more software modules associated with one or more content stores at the upstream facility 130. The content management software 140 of upstream facility 130 can store content received by the upstream facility 130 in the content store 135 of upstream facility 130, and can also respond to requests for content by retrieving the requested content from the content store 135.

LDOs 105 can communicate with one or more upstream facilities 130 via one or more upstream networks 145. Also, upstream facilities 130 can communicate with one or more other upstream facilities or devices via upstream networks 145. The upstream network 145 can be, for example, a backbone network, an Internet or IP network, an Ethernet network, a computer network, a web-based network, a wide area network, a local area network, a metropolitan area network, a regional network, a metro Ethernet network, or any other wired or wireless network or network system.

Both LDOs 105 and upstream facilities 130 can provide content, for example via video on demand (VOD) servers, broadcast video servers, streaming servers, using a variety of protocols (including Internet Protocol) and video formats (such as MPEG). As mentioned, servers or other computing devices residing at an LDO 105 or upstream facility 130 can run software operable to process requests and serve content to requesting devices, such as user device 120.

Still referring to FIG. 1, typically, user devices 125 request content from an LDO 105. If the content is available at the LDO 105, it is retrieved, for example from LDO content store 110, and transmitted by the LDO 105 through the transport network 125. If the content is not available, it can be requested from a source further upstream, for example upstream facility 130.

Figure 2:
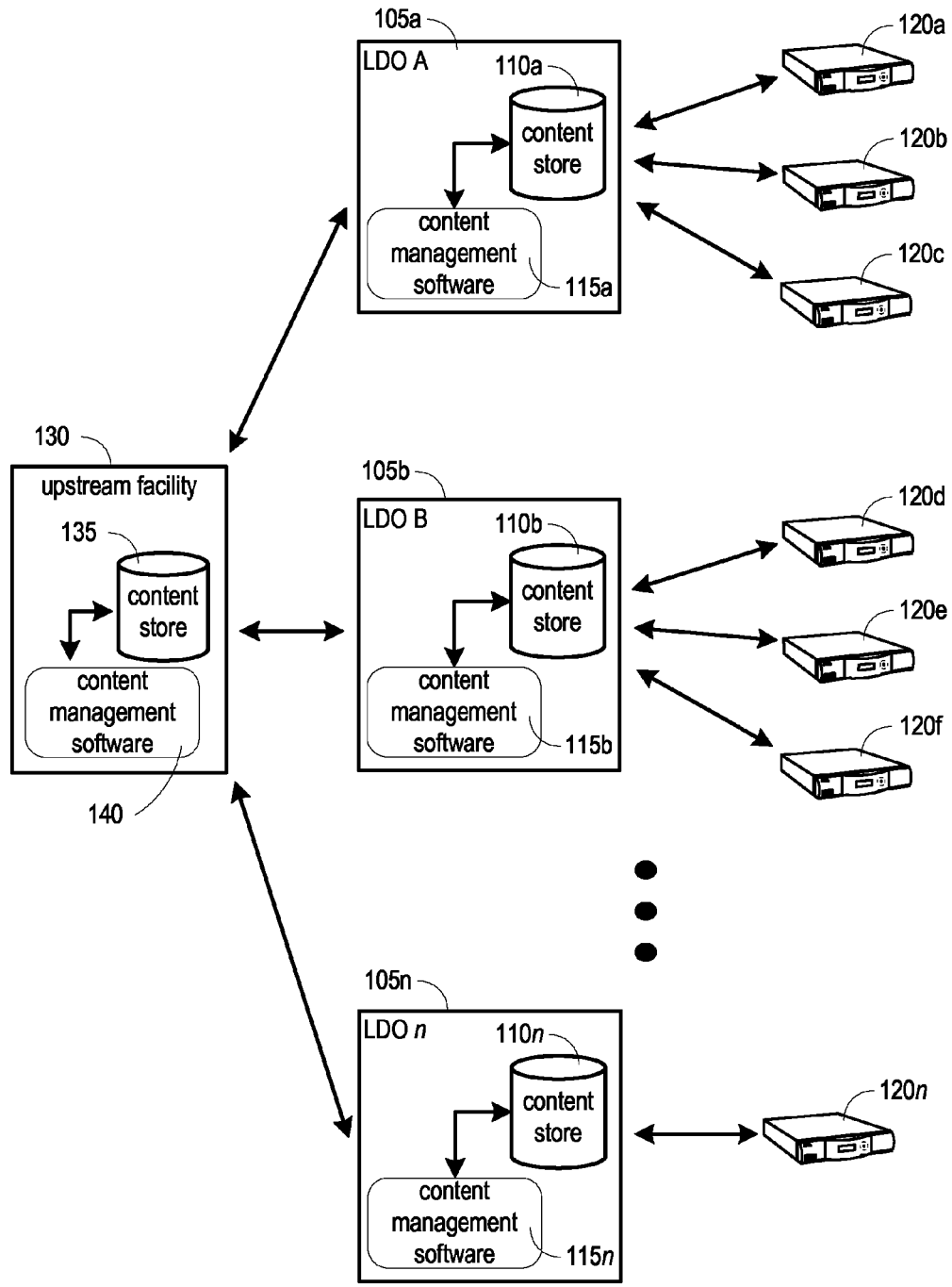
FIG. 2 is a block diagram illustrating a typical network environment in which each LDO is unaware of the content managed and stored by other LDOs.

FIG. 2 shows another view of an example of a typical content delivery network. This block diagram depicts one or more user devices 120a-n, one or more LDOs 105 that serve the user devices 120a-n, and an upstream facility 130 that serves the LDOs 105. While the user devices 120 can communicate between the LDOs 105 via one or more LDO-to-premises transport networks 125, and the LDOs 105 can communicate with upstream facilities 130 via one or more upstream networks 145, the LDO-to-premises transport network 125 and the upstream networks 145 have been omitted from the diagram for clarity.

In a typical content delivery network, an LDO, for example LDO A 105a, can request content from an upstream facility 130. When the content arrives at LDO A 105a, one or more software modules at LDO A 105a, for example content management software 115a, can be operative to store the content on a content store device 110a of LDO A 105a. In some implementations, LDO A 105a can be, for example, a conventional integrated services architecture (ISA) headend. The ISA specifies provisioning and management functions for software components and interfaces between them that can enable interactive services in a cable television framework.

In typical implementations in which an ISA headend is employed, content management module 115a can include two modules. One module of a content management software 115a, which can be referred to as the "ASSET component," can send a request via the other module, which can be referred to as the "CONTENT component," to have a copy of the content stored on the content store 110a. The ASSET component can make the request through, for example, the creation of a content object using the common object request broker architecture (CORBA) framework, or some other object oriented framework, to represent the context of the content item. Once the context is created, the ASSET component can then use it to transfer the content item onto the content store 110a. A success or failure is returned after the transfer is made.

In a typical operation of an ISA headend, when user devices 120a-c, associated with LDO A 105a, stop requesting the content item, for example an MPEG file, then the ASSET component instructs the CONTENT component to remove the item (for example, destroy or delete the content item), and the CONTENT component immediately does so. Typically, the removal of content is usually governed by contract terms, which can specify how long a content item can remain in the system (the "license window" of the content. However, policies that position content according to popularity can react to demand from CPEs. With such a response, the content could have been subject to the policies of two different ASSET components, one of which may not want the content to be destroyed (or the license window of the content had not expired). Thus, a situation arises wherein each LDO CONTENT component is responsive only to the ASSET component and policies of that LDO. For example, a user device 120d might have requested the same MPEG file, but the unavailability of the file at LDO B 105b and the destruction of the file at LDO A 105a results in a request by LDO B 105b to obtain the content from sources further upstream. Thus, in this typical implementation, requests are made to an upstream facility, and content is transmitted downstream, even though the content may have already been present amongst a plurality of LDOs served by the same upstream facility. Additionally, one or more LDOs might be storing the same content as another LDO served by the same upstream facility. And, one or more LDOs might have deleted content even when an LDO that did not possess the content now wants it.

Figure 3:
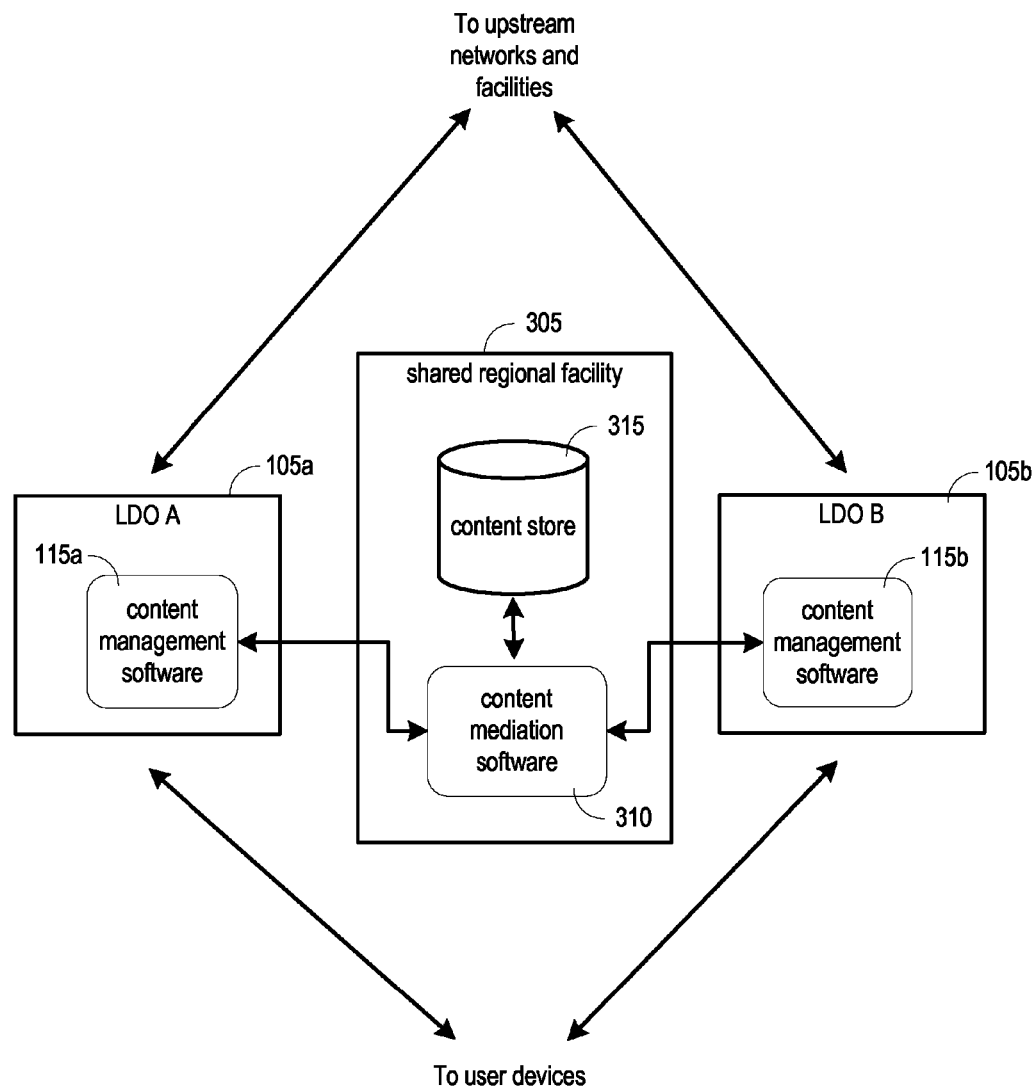
FIG. 3 is a block diagram illustrating an example of content mediation software that manages content on a content store shared between one or more LDOs, which also have content management software

FIG. 3 shows an example implementation of a network in which LDOs can share resources at a regional level. In FIG. 3, LDO A 105a and LDO B 105b can both communicate with a shared regional facility 305, which is separate from an upstream facility, such as upstream facility 130. LDOs can communicate with the shared regional facility 305 via wireless or wire line networks. Shared regional facility 305 can include content mediation software 310 and content store 315. Content mediation software 310, like content management software 115, can be one or more software modules operative to respond to and process requests for content, and store and retrieve content, thus making it operative to mediate requests from the content management software 115 of different LDOs 105. Content store 315 can be a data storage device or repository that can store content.

In some implementations, if a content item was received at an LDO, for example LDO A 105a of FIG. 3, from upstream facility 130, content management software 115a can send a message to the content mediation software 310 of shared regional facility 305. The message can notify, or be used to notify, the content mediation software 310 that LDO A 105a has a content item. The message can include, for example, the filename of the content item, as well as any metadata that can inform of the characteristics of the content item, or be used to distinguish the content item from other similarly named content items, or previous versions of other similarly named content items.

After the message is received by the content mediation software 310, the content mediation software 310 can determine whether a content store 315 associated with the shared regional facility 305 contains a copy of the content item. The content mediation software 310 can make this determination based on, for example, the information contained in the message that originated from the LDO's content management software 115a. The content mediation software, or any module(s) it may have, such as the MEDIATOR component of FIG. 4, can use the filename of the content item, or any other metadata or information associated therewith, to determine whether the content item is already in the content store. It can make this determination by comparing information associated with the content item received from the content management software 115a, including the filename and/or any associated metadata, with the filename and/or associated metadata of any content items in the content store 315. If the content item is not present, the content mediation software 310 can request that content management software 115a provision/provide the content item to the content mediation software 310. The content mediation software 310 can receive the content item and store the content item (along with any associated metadata) on the content store 315.

In some implementations, if the content item is not stored in the content store 315, the content mediation software 310 can be operative not to send any response or feedback to the content management software 115a. The content management software 115a can be operative to provision the content item if it does not receive any feedback from the content mediation software.

The content item might already exist in the content store 315. It may have already been provisioned by, for example, the content management software 115b of LDO B 105b, or some other LDO connected to the shared regional facility 305. If the content mediation software 310 determines that the content already exists on the content store 315, it can send a communication to the content management software 115a instructing the content management software to discontinue with the transfer process. The communication can also be a message that the content management software 115a can receive and process so as not to provision the content item. For example, the message can be an indication or acknowledgement wherein a bit has been set from 0 to 1 for a particular field. Because the content mediation software 315 determined that a copy already existed on the content store 315, and provided feedback to the content management software 115b, no additional resources need be consumed for the content management software 115b to provision the content item again.

In some implementations, each time the content mediation software 310 receives a notification of a content item, regardless of whether the content exists on the content store, the content mediation software 310 can request its provision. The content mediation software 310 can move the content item in the content store 315, or replace a dissimilar (e.g., outdated) copy.

In some implementations, the content management software of an LDO will provision a content item each time the content item is received by the LDO. The content mediation software 310 can move the content item in the content store 315, or replace a dissimilar (e.g., outdated) copy.

Likewise, if LDO B 105b received a content item, content management software 115b can also send a message to the content mediation software 310 of the shared regional facility 305 to inform the content mediation software 310 that LDO B 105b has the content item. The process as described above, wherein the content mediation software 310 can determine if the content item exists on content store 315, and then ask for content (or metadata) to be provisioned, can be repeated. Here, the content item might already exist in content store 315 because the same content item had been provisioned previously by another LDO, such as LDO A 105a.

Still referring to FIG. 3, for each instance that the content management software of an LDO informs the content mediation software 310 that it has a content item, the content mediation software 310 can be operative to record that the content item is in demand/interest at that LDO. Subsequently, if one LDO requests that the content item be deleted, the content mediation software 310 at the shared regional facility 305 will remove from its record or database indications the content item is still in demand by the LDO requesting destruction. Then, the content mediation software 310 can determine whether any other LDOs have demand for, or interest in, the content item. The content mediation software 310 can be operative to wait until it has no record of any LDO demanding the content item before deleting the content item.

As an example, if the content management software 115a of LDO A 105a informs the content mediation software 310 that it has a content item, content mediation software 310 can record that LDO A is using the content item (and thus, it is still in use and demand at LDO A 105a). LDO B 105b might also receive the same content item and when its content management software 115b informs the content mediation software 310 that it has the content item, the content mediation software 310 can also record that the content item is in demand at LDO B 105b. Thus, in this example implementation, both LDO A 105a and LDO B 105b have a demand for the same content asset. If the content management software 115a of LDO A 105a requests destruction of the content item, the content mediation software 310 will not delete the content item yet. Rather, it will remove in the record that LDO A is still interested in this content item. There would still be a record that LDO B 105b has interest in the content item. If the content mediation software 310 subsequently receives a request from content management software 115b to destroy the content item, then content mediation software 310 would remove the indication from the record that the content item is in demand at LDO B 105b. When all LDO indications of demand for the content item have been removed—in this case LDO A 105a and LDO B 105b—the content mediation software can then destroy the content item. Until the content item is removed, any LDO connected with the shared regional facility that might need the content item—for example due to an end user device request for the content item—can obtain a copy from the content store of that shared regional facility. The LDO would not need to request the content item from an upstream facility.

Figure 4:
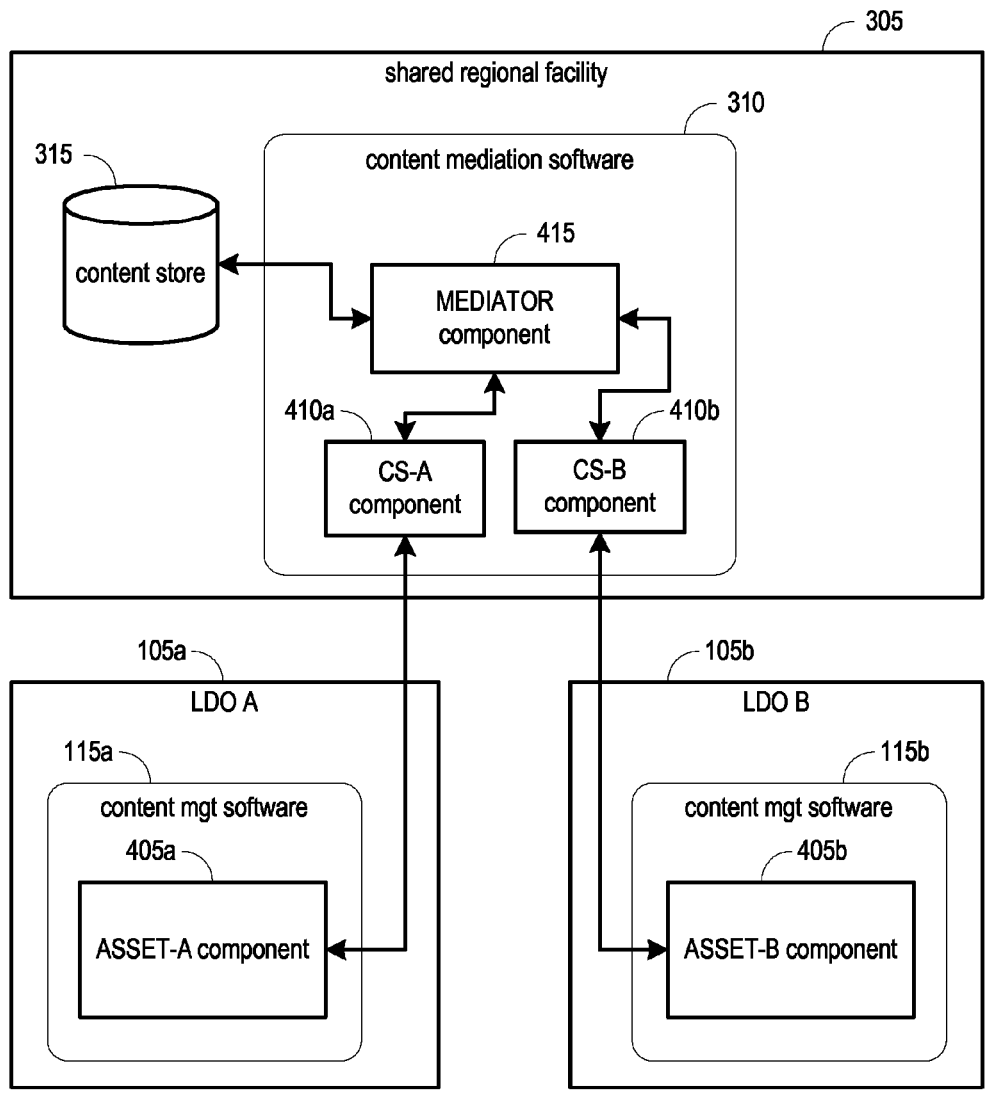
FIG. 4 is a block diagram illustrating an example of components that can be part of the content mediation software at a shared regional facility and content management software that manages content on a content store shared between one or more LDOs.

FIG. 4 shows a block diagram of an example implementation in which the content mediation software of shared regional facilities and the content management software of LDOs include one or more component modules. The content mediation software can be content mediation software 310 of shared facility 305, and the content management software can be content management software 115a of LDO A 105a, and content management software 115b of LDO B 105b. Content management software 115a can have an ASSET-A component 405a and content management software 115b can have an ASSET-B component 405b. The content mediation software 310 can have, for example, a CS-A component 410a, a CS-B component 410b, and a mediator component 415. The drawings of connections to user devices and to upstream networks and facilities have been removed from this diagram for clarity.

In some implementations, LDO A 105a and LDO B 105b can be ISA headends. A content item, for example an MPEG file, arrives at LDO A 105a. The ASSET-A component 405a of content management software 115a can use an object oriented framework, such as CORBA, to request the creation of a content object on the content store interface that it is associated with, which can be, for example, the CS-A component 410a of content mediation software 310. The CS-A component 410a can return a CORBA context for the MPEG file. ASSET-A can then use the context to provision the MPEG file to the CS-A component 410a. However, when the ASSET-A component 405a makes this request, the CS-A component 410a can forward this request to a MEDIATOR component 415 of the content mediation software 310. The MEDIATOR component 415 can be operative to determine whether it already has the relevant MPEG file (i.e., whether the MPEG file is already in the content store 315). It can do so by using the content items information details, which can include its filename and metadata. If the MPEG file is already in the content store 315, then the MEDIATOR component 310 can simply record that ASSET-A is still interested in the MPEG file (or "knows" about it), and return a success message with no further processing, resulting in one copy of the MPEG remaining in the content store 315.

In some implementations, if there is no such MPEG file in the content store 315, then the ASSET-A component 405a and the MEDIATOR component 410a can proceed with the conventional transfer of the MPEG file before recording the fact that LDO A 105a has an interest in the MPEG file (and thus "knows" about the content item) and returns a "success" message.

If LDO B 105b receives the same MPEG file, and the ASSET-B component 405b attempts to transfer it to the CS-B component 410b in a similar fashion, the MEDIATOR component 415 will record the fact that LDO B 105b, and in this example, the ASSET-B component 405b, now knows about the MPEG file and can return a success message without actually transferring the MPEG a second time.

A similar process is followed for the removal of content from the system, in this case from the content store 315. When the removal instruction for a content item arrives at MEDIATOR Component 415 by way of one of the CS interfaces, the MEDIATOR component will remove the notation that ASSET-n "knows" about the content item, and then remove the content item only if ASSET-n was the last ASSET that "knew" about the content item.

Figure 5:
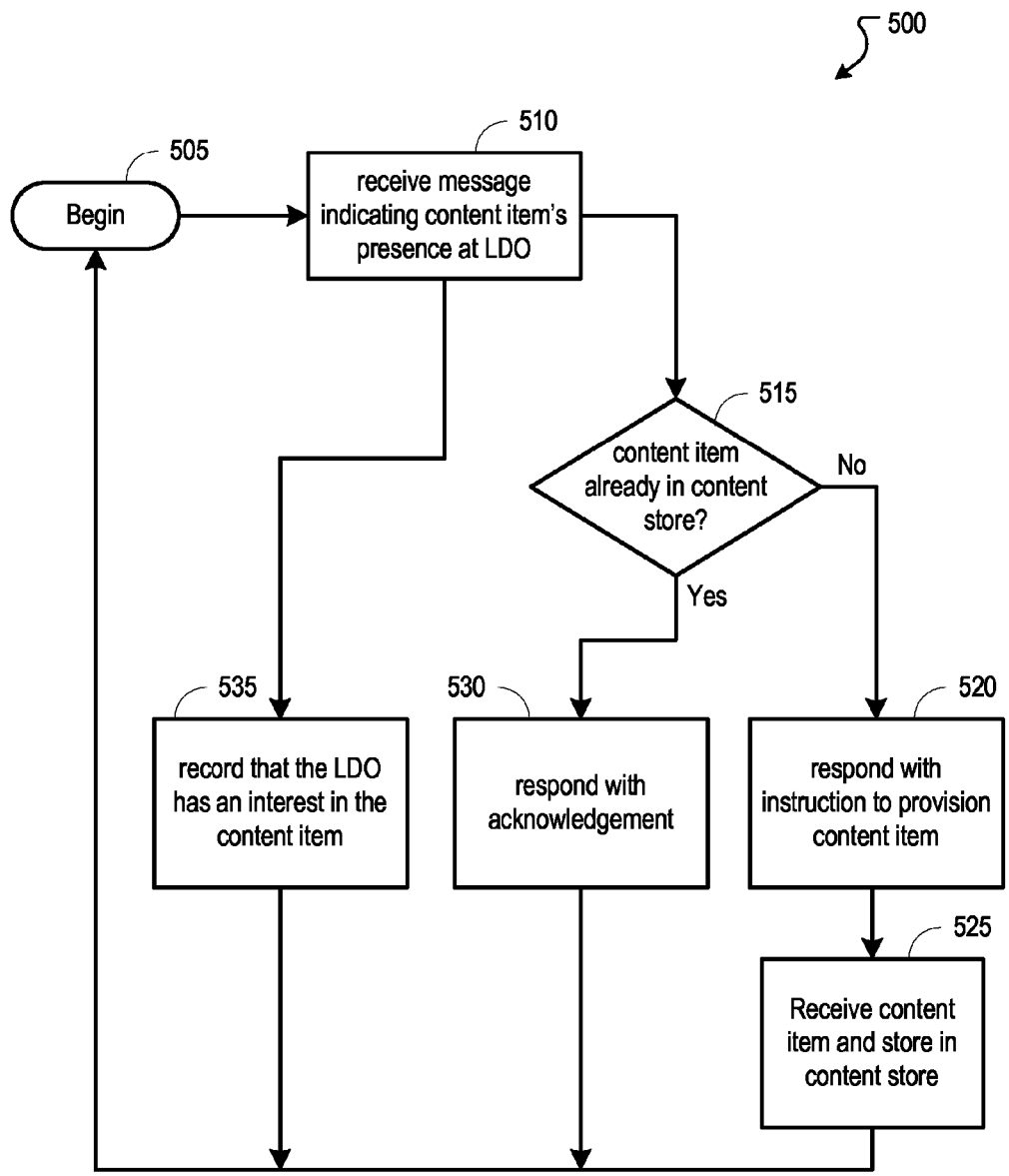
FIG. 5 is a flow diagram illustrating an example process for adding content that can be performed by content mediation software operating at a shared regional facility.

FIG. 5 is a flowchart illustrating an example process 500 that can be performed by content mediation software at a shared regional facility. The process 500 can begin at stage 505 wherein a content item has arrived at an LDO (e.g., LDO A 105a of FIGS. 1-4). After arriving at the LDO, the content management software of the LDO (e.g., content management software 115a from FIGS. 1-4) can send a message indicating the content item's presence at the LDO. The message can be a notification that the LDO has a content item that includes, for example, the filename of the content item, as well as any metadata that can inform of the characteristics of the content item, or be used to distinguish the content item from other similarly named content items, or previous versions of other similarly named content items. In some implementations, content management software can have one or more software modules (e.g., ASSET-A component 405a of FIG. 4) that can be operative to send this message. In some implementations, the message can be a request to create a CORBA content object.

At stage 510, the message indicating the content item's presence at the LDO can be received. It can be received by content mediation software (e.g., content mediation software 310 of FIGS. 3-4) of a shared regional facility (e.g., shared regional facility 305 of FIGS. 3 and 4). In some implementations, the message can be received by one or more software modules (e.g., CS-A component 410a of FIG. 4) of the content mediation software at the shared regional facility.

In some implementations, one or more modules of the content mediation software (e.g., CS-A component of FIG. 4) can be operative to forward the message, which can be a request to create a CORBA content object, to one or more other modules of the content mediation software (e.g., MEDIATOR component of FIG. 4).

At stage 515, a determination can be made as to whether a copy of the content item is contained. The content mediation software (e.g., content mediation software 310 of FIGS. 3-4) of the shared regional facility (e.g., shared regional facility 305 of FIGS. 3-4) can be operative to determine whether a content store (e.g., content store 315) associated with the shared regional facility (e.g., shared regional facility 305) contains a copy of the content item. This determination can be made based on, for example, the information contained in a message that originated from the LDO's content management software (e.g., content management software 115a). The content mediation software, or any module(s) it may have (e.g., the MEDIATOR component of FIG. 4) can use the filename of the content item, or any other metadata or information associated therewith, to determine whether the content item is already in the content store. It can make this determination by comparing information associated with the content item received from the content management software, including the filename and/or any associated metadata, with the filename and/or associated metadata of any content items in the content store.

In some implementations, prior to determining whether the content item is already in the content store associated with the shared regional facility, one or more modules of the content mediation software (e.g., CS-A component of FIG. 4) can be operative to return a CORBA context for the content item in response to a message that includes a request to create a CORBA content object from one or more modules of the content management software (e.g., ASSET-A component of FIG. 4).

At stage 520, if it is determined that the content item is not already in the content store, an instruction can be sent to provision the content item. For example, if the content mediation software (e.g., content mediation software 310 of FIGS. 3-4) determined that the content item is not present, the content mediation software can request that the content management software (e.g., content management software 115a of FIGS. 1-4) provision/provide the content item to the content mediation software.

At stage 525, a content item and be received and stored in the content store. For example, the content mediation software (e.g., content mediation software 310 of FIGS. 3-4) can receive the content item and store the content item (along with any associated metadata) on an associated content store (e.g., content store 315 of FIGS. 3-4).

In some implementations, if the content item is not stored in the content store (e.g., content store 315 of FIGS. 3-4), the content mediation software (e.g., content mediation software 310 of FIGS. 3-4) can be operative not to send any response or feedback to the content management software (e.g., content management software 115a of FIGS. 1-4). The content management software can be operative to provision the content item if it does not receive any feedback from the content mediation software.

At stage 530, if it is determined that the content item already exists in the content store, a communication can be sent to discontinue any transfer process. For example, if the content mediation software (e.g., content mediation software 310 of FIGS. 3-4) determines that the content already exists on the content store (e.g., content store 315 of FIGS. 3-4), it can send a communication to the LDO content management software (e.g., content management software 115a of FIGS. 1-4) instructing the content management software to discontinue with the transfer process. The communication can also be a message that the content management software 115a can receive and process so as not to provision the content item. For example, the message can be an indication or acknowledgement wherein a bit has been set from 0 to 1 for a particular field.

In some implementations, each time the content mediation software 310 receives a notification of a content item, regardless of whether the content exists on the content store, the content mediation software 310 can request its provision. The content mediation software 310 can move the content item in the content store 315, or replace a dissimilar (e.g., outdated) copy.

In some implementations, the content management software of an LDO will provision a content item each time the content item is received by the LDO. The content mediation software 310 can move the content item in the content store 315, or replace a dissimilar (e.g., outdated) copy.

At stage 535, anytime a message is sent informing of an interest in a content item, a record can be made that the content item is in demand or of interest. For example, anytime after content management software of an LDO (e.g., content management software 115a of FIGS. 1-4) informs the content mediation software (e.g., content mediation software 310 of FIGS. 3-4) that it has a content item, the content mediation software can be operative to record that the content item is in demand/interest at that LDO.

The example process of FIG. 5 can then repeat itself.

Figure 6:
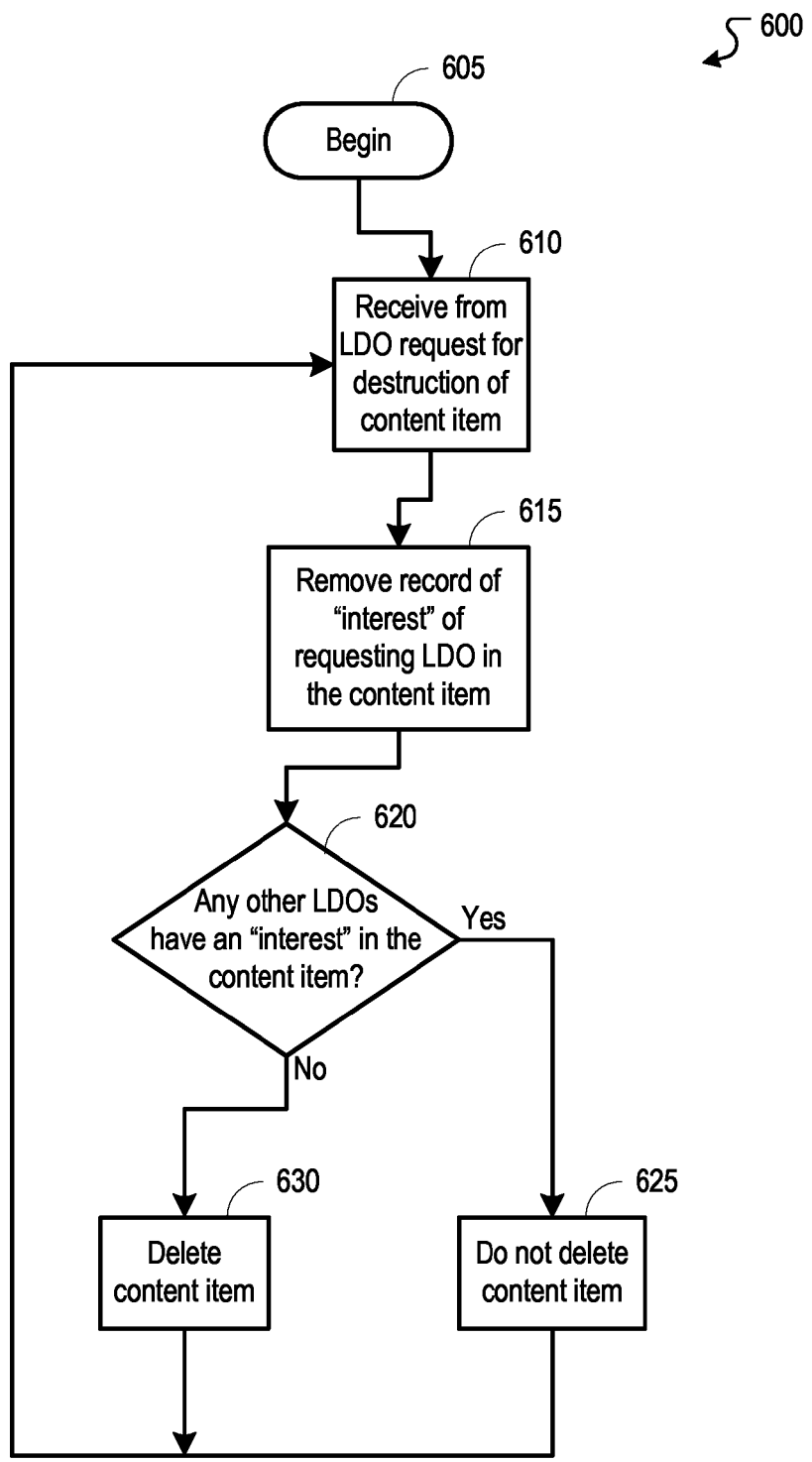
FIG. 6 is a flow diagram illustrating another example process, namely one for removal of content from the system, which can be performed by content mediation software operating at a shared regional facility.

FIG. 6 describes an example of a process for deleting content items that can be executed by content mediation software (e.g., content mediation software 310 of FIGS. 3-4) at the shared regional facility (e.g., shared regional facility 305 of FIGS. 3-4).

The process of FIG. 6 can begin at stage 605, wherein content items might have been stored in a content store associated with a shared regional facility (e.g., content store 315 of shared regional facility 305 of FIG. 3-4), and wherein one or more modules of the content mediation software (e.g., content mediation software 310 of shared regional facility 305 of FIGS. 3-4) have recorded that one or more LDOs (e.g., LDOs 105a-n of FIGS. 1-4) "knows," or has an interest in, one or more content items stored in the content store of the shared regional facility.

At stage 610, a request for a content item to be destroyed/deleted can be received. The request can be sent by the content store (e.g., content store 315 of FIGS. 3-4) at a shared regional facility (e.g., shared regional facility 305 of FIGS. 3-4). The request can be received by content mediation software (e.g., the content mediation software 310 of FIGS. 3-4) at the shared regional facility (e.g., shared regional facility 305 of FIGS. 3-4). In some implementations, the request can be received by one or more modules (e.g., the MEDIATOR component of FIG. 4) of the content mediation software. The request can be made by content management software (e.g., content management software 115a of FIGS. 1-4) of an LDO (e.g., LDO A 105a of FIGS. 1-4) associated with the shared regional facility. In some implementations, one or more modules (e.g., ASSET-A component of FIG. 4) of the content management software can request the content item's deletion/destruction. In some implementations, one or more modules of the content mediation software (e.g., CS-A component 410a of FIG. 4) can be operative to forward the request for the content item's deletion/destruction to one or more other modules of the content mediation software (e.g., the MEDIATOR component of FIG. 4).

At stage 615, any record that the LDO (e.g., LDO A 105a) has an interest in the content item that the LDO requested to be deleted can be removed. It can be removed by the content mediation software (e.g., the content mediation software 310 of FIGS. 3-4) at the shared regional facility (e.g., shared regional facility 305 of FIGS. 3-4). In some implementations, the record of interest can be removed by one or more modules (e.g., the MEDIATOR component of FIG. 4) of the content mediation software.

At stage 620, a determination of whether any other LDOs have demand for, or interest in, the content item whose deletion has been requested. The determination can be made by the content mediation software (e.g., the content mediation software 310 of FIGS. 3-4) at the shared regional facility (e.g., shared regional facility 305 of FIGS. 3-4). In some implementations, the determination can be made by one or more modules (e.g., the MEDIATOR component of FIG. 4) of the content mediation software. The content mediation software, or one or more modules thereof, can perform a search of its databases or records containing the indications of interest prior to making the determination.

If a determination is made at 620 that there is a record that an LDO has knowledge of (or interest in) the content item whose deletion/destruction was requested at stage 610, the process can move to stage 625, whereby no action is taken to delete the content item.

If there are no records that an LDO has knowledge of (or interest in) the content item whose deletion/destruction was requested at stage 610, the process can move to stage 630, whereby the content item can be deleted from the content store (e.g., content store 315 of FIG. 3-4). The deletion/destruction can be performed by content mediation software (e.g., the content mediation software 310 of FIGS. 3-4) at the shared regional facility (e.g., shared regional facility 305 of FIGS. 3-4). In some implementations, the deletion can be made by one or more modules (e.g., the MEDIATOR component of FIG. 4) of the content mediation software.

The process can repeat by moving to stage 605, wherein content mediation software (e.g., content mediation software 310 of FIGS. 3-4), and in some implementations one or more of its software modules (e.g., the MEDIATOR component of FIG. 4) can wait for further requests for deletion/destruction of content items.

Any of the devices (e.g., video servers, CMTS, cable modems, EMTAs, etc.) and components thereof, or software modules/programs described in this disclosure, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal can be an artificially generated signal, e.g., a machine generated electrical, optical, or electromagnetic signal that can be generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube), LCD (liquid crystal display), LED (light emitting diode) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what might be claimed, but rather as descriptions of features that might be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features might be described above as acting in certain combinations and even initially claimed as such, one or more features from a claimed combination can in some cases be excised from the combination, and the claimed combination might be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing might be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing might be advantageous.

What is claimed is:

1. A method for managing content at a shared regional facility associated with a plurality of local distribution offices comprising:
    receiving at the shared regional facility from a local distribution office among the plurality of local distribution offices a message indicating that a video content item is present at a first local distribution office, wherein the shared regional facility is located remotely from the plurality of local distribution offices and is independent of upstream networks and facilities;
    determining whether a content store for the shared regional facility contains a copy of the video content item;
    if no copy of the video content item is contained in the content store, sending a request to the local distribution office to copy the video content item to the content store for the shared regional facility;
    recording an indication that the local distribution office has interest in the video content item;
    receiving a request from the local distribution office to delete the video content item stored in a content store at the shared regional facility;
    removing an indication that the local distribution office has an interest in the video content item;
    determining whether there are any other records indicating that any of the other plurality of local distribution offices have interest in the video content item; and
    if there are no other indications that other local distribution offices have interest in the video content item, deleting the video content item from the content store for the shared regional facility.

2. The method of claim 1, wherein each of the plurality of local distribution offices comprises a headend of a cable network.

3. The method of claim 2, wherein the headend of a cable network further comprises an ISA headend.

4. The method of claim 1, wherein the message comprises a request to create a CORBA content object.

5. The method of claim 1, wherein the message comprises the filename of the content item.

6. The method of claim 1, wherein the message comprises metadata associated with the content item.

7. The method of claim 1, wherein the message was sent by a content management software.

8. The method of claim 7, wherein the content management software comprises an ASSET component module.

9. The method of claim 1, wherein determining whether a content store associated with the shared regional facility contains a copy of the content item comprises using the filename associated with the content item.

10. The method of claim 1, wherein determining whether a content store associated with the shared regional facility contains a copy of the content item comprises using the metadata associated with the content item.

11. The method of claim 1, wherein determining whether a content store associated with the shared regional facility contains a copy of the content item is performed by a MEDIATOR component module.

* * * * *